United States Patent
Azarfar et al.

(10) Patent No.: US 12,055,458 B2
(45) Date of Patent: Aug. 6, 2024

(54) DEVICE FOR IDENTIFYING A ROTATING COMPONENT DEFECT

(71) Applicant: AKTIEBOLAGET SKF, Gothenburg (SE)

(72) Inventors: Alireza Azarfar, Utrecht (NL); Lambert Karel van Vugt, Media, PA (US); Cornelis Harm Taal, Utrecht (NL); Kareem Gouda, Utrecht (NL); Elizabertus Maljaars, Houten (NL)

(73) Assignee: AKTIEBOLAGET SKF, Gothenburg (SE)

( * ) Notice: Subject to any disclaimer, the term of this patent is extended or adjusted under 35 U.S.C. 154(b) by 87 days.

(21) Appl. No.: 17/874,566

(22) Filed: Jul. 27, 2022

(65) Prior Publication Data
US 2023/0073415 A1    Mar. 9, 2023

(51) Int. Cl.
*G01M 13/045*    (2019.01)

(52) U.S. Cl.
CPC ................. *G01M 13/045* (2013.01)

(58) Field of Classification Search
None
See application file for complete search history.

(56) References Cited

U.S. PATENT DOCUMENTS

| | | | |
|---|---|---|---|
| 6,370,957 B1* | 4/2002 | Filippenko | G01H 1/003 73/659 |
| 2016/0305844 A1* | 10/2016 | Ochsenfeld | G01M 7/00 |

* cited by examiner

*Primary Examiner* — Lisa M Caputo
*Assistant Examiner* — Cynthia L Davis
(74) *Attorney, Agent, or Firm* — J-TEK LAW PLLC; Scott T. Wakeman; Mark A. Ussai

(57) ABSTRACT

A method of identifying at least one defect of a rotating component, where the defect is selected from a group of predefined defects, includes extracting frequency data related to each of the predefined defects in order to form a first spectrum signature for each of the predefined defects. Also measuring at least one vibration signal produced by the rotating component to obtain at least two second spectrums, filtering each second spectrum based on an exponential smoothing algorithm, selecting peaks in each second spectrum according to a prominence of each of the peaks, setting selected peaks to zero if the selected peaks are not present in a predefined number of consecutive second spectrums, and calculating a probability that each first spectrum signature corresponds to at least one of the second spectrums.

11 Claims, 1 Drawing Sheet

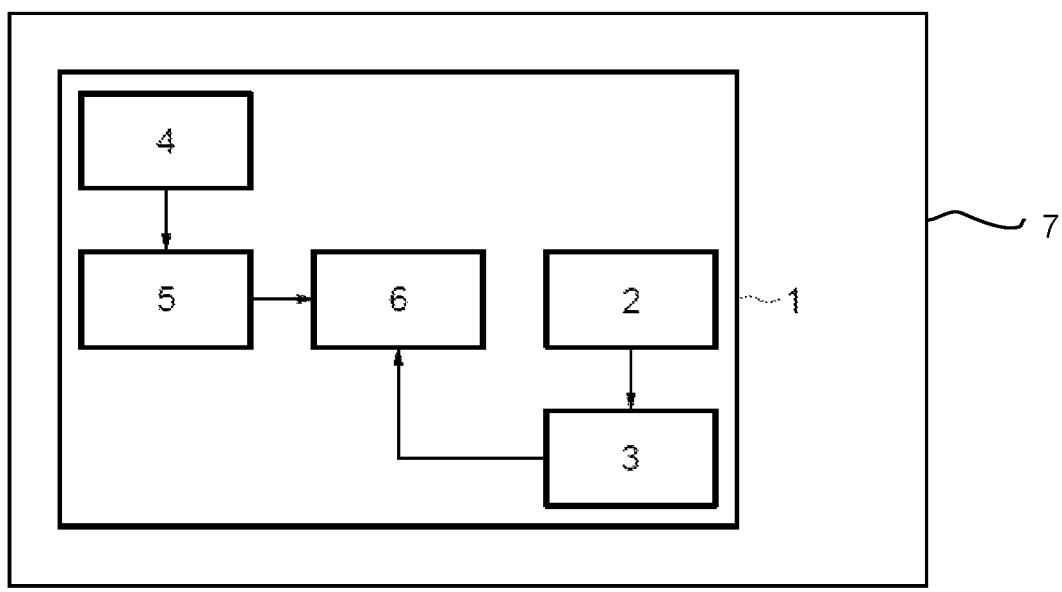

DEVICE FOR IDENTIFYING A ROTATING COMPONENT DEFECT

CROSS-REFERENCE

This application claims priority to German patent application no. 10 2021 209 957.2 filed on Sep. 9, 2021, the contents of which are fully incorporated herein by reference.

TECHNOLOGICAL FIELD

The present disclosure is directed to signal processing methods and devices suitable for detecting a degradation of a rotating component. More specifically, the disclosure is directed to a method and apparatus for processing vibration signals caused by rotating components.

BACKGROUND

In many industrial fields, system monitoring and diagnostics have gained in prominence due to the increased complexity of modern electrical systems and their operating costs which are mainly related to maintenance. To reduce these costs, predictive maintenance is used to anticipate possible breakdowns and thus shorten the unavailability time of systems such as rotary machines.

The bearings of rotary machines are the components that are most prone to developing defects. Therefore, it is important to detect the onset of defects as early as possible. In particular, as a degree of bearing degradation increases, frictional effects in the bearing components may transmit torque from a rotating element to a non-rotating element, which can cause damage.

As the different types of bearing defects generate distinct vibration profiles, diagnostic methods are mainly based on the analysis of the vibrations excited by the defect in the bearing. The defects may thus be detected using accelerometers at fixed locations adjacent to the monitored bearings. However, the accuracy of detectability is not satisfactory because of a low signal to noise ratio in the sensed vibration. Furthermore, bearing defects may not always appear at expected frequencies.

SUMMARY

Thus, a first aspect of the present disclosure is to improve the accuracy of defect detection based on an analysis of vibration signals.

For this purpose, it is provided, according to a first aspect, a method of identifying at least one defect of a rotating component among a group of predefined defects, the method comprising:
  extracting frequency data related to each predefined defect in order to form its first spectrum signature;
  measuring at least one vibration signal, when the rotating component is operating, to obtain at least two second spectrums;
  filtering each second spectrum based on an exponential smoothing algorithm, characterized in that the method comprises:
  selecting peaks in each second spectrum according to their prominence;
  setting selected peaks to zero if they are not present in a predefined number of consecutive second spectrums and,
  calculating the probability for each first generated spectrum signature to correspond to the second spectrums (determining a correlation of the spectrum signature and the second spectrums).

In other words, the disclosure first uses at least two sequential vibration measurements or chunks the vibration signal into at least two parts, which makes it possible to reduce the noise in the second two spectrums. The noise is then decreased by filtering each second spectrum by adjusting the noise threshold according to exponentially filtered values of rms in current and previous measurements.

To further increase the accuracy, the second spectrums are compared to each first spectrum that characterizes a defect. The greater the similarity, the higher the probability that the vibration signal is generated by this defect.

In one embodiment, the frequency data comprises harmonics and sidebands of each predefined defect. The data are used to generate a first spectrum assigned to a predefined defect.

In one embodiment, the peaks selection is done by an integrative leaky average algorithm.

In one embodiment, the method comprises a selection of the unknown peaks in each second spectrum based on the most probable first spectrum signature.

According to another aspect, the invention further comprises a device for identifying at least one defect of a rotating component among a group of predefined defects, comprising:
  acquisition means configured to extract frequency data related to each predefined defect;
  computing means configured to form a first spectrum signature from each group of the frequency data;
  a vibration sensor configured to measure at least one vibration signal, when the rotating component is operating, to obtain at least two second spectrums;
  a filter configured to filter each second spectrum based on an exponential smoothing algorithm, characterized in that the device comprises:
  processing means configured to select peaks in each second spectrum according to their prominence, setting selected peaks to zero if they are not present in a predefined number of consecutive second spectrums, and calculating the probability for each first generated spectrum signature to correspond to the second spectrums.

In one embodiment, frequency data comprise harmonics and sidebands of each predefined defect.

In one embodiment, the processing means are configured to select the peaks by using an integrative leaky average algorithm.

In one embodiment, the processing means are configured to select the unknown peaks in each second spectrum based on the most probable first spectrum signature.

According to another aspect, the disclosure comprise a method of identifying at least one defect of a rotating component, the at least one defect being selected from a group of predefined defects. The method includes providing a first spectrum signature for each of the predefined defects, measuring at least one vibration signal produced by the rotating component to obtain at least two second spectrums, filtering each second spectrum based on an exponential smoothing algorithm, selecting peaks in each second spectrum according to a prominence of each of the peaks, setting the selected peaks to zero if the selected peaks are not present in a predefined number of consecutive second spectrums, and calculating a correlation between each first spectrum signature and each of the second spectrums.

The disclosure further comprises an integrated circuit comprising a device for identifying at least one defect of a rotating component among a group of predefined defects as defined above.

The invention also comprises a bearing comprising an integrated circuit inside its housing as defined above.

BRIEF DESCRIPTION OF THE DRAWINGS

The present invention and its advantages will be better understood by studying the detailed description of a specific embodiment given by way of a non-limiting example and illustrated by the appended drawings on which:

FIG. 1 is a schematic illustration of a device configured to identify at least one defect of a rotating component according to an embodiment of the present disclosure.

DETAILED DESCRIPTION

FIG. 1 shows a device 1 configured to identify at least one defect of a rotating component among a group of predefined defects.

Among the rotating components, bearings are most prone to defect and therefore need to detect the onset of a defect as early as possible to prevent damage. For this purpose, the device 1 comprises an interface 2 (an acquisition means) configured to extract from a database frequency data related to each of a plurality of predefined defects and send the frequency data to a first processor 3 (a computing means) configured to form a first spectrum signature. In other words, each first spectrum signature is related to specific known defect. The interface 2 may comprise an element of the first processor 3.

The first spectrum signature is thus intended to be compared to a second spectrum constructed by processing a vibration signal that is generated by a bearing 7. The more similar the second spectrum is to a first spectrum signature, the greater the probability that the vibration signal is generated by the defect identified by the first spectrum.

To perform this comparison, the device 1 comprises a vibration sensor 4 configured to measure, when the bearing is operating, at least one vibration signal to obtain at least two second spectrums (spectrum signatures) and then increase detectability of a defect. In particular, the vibration signal is divided into at least two parts wherein each part is used to generate a second spectrum. As an alternative, the vibration sensor 4 performs two vibration signal measurements wherein each signal is used to generate a second spectrum.

To reduce the noise of each second spectrum and increase the detectability of a defect, the device 1 also includes a filter 5 configured to filter each second spectrum based on an exponential smoothing algorithm. Basic (simple) exponential smoothing and double exponential smoothing, which is also known as second-order exponential smoothing, are two examples of exponential smoothing algorithms. The double exponential smoothing can be performed by the Holt-Winters or the Brown method for example.

The filtered second spectrums are then sent to a second processor 6 (processing means) configured to select peaks in each second spectrum according to their prominence by processing an integrative leaky average algorithm. Specifically, the prominence of a peak measures how much a peak stands out from the surrounding baseline of the spectrum and is defined as the vertical distance between the peak and its lowest contour line. The second processor 6 may be separate from the first processor 3 or may comprise a portion of the first processor 3; that is, the first processor 3 and second processor 6 are identified as separate elements to help illustrate the logic of the disclosed device but all functions may be performed by a single appropriately configured processor.

To suppress random peaks that occur among the selected peaks, the second processor 6 is also configured to set selected peaks to zero if they are not present in a predefined number of consecutive second spectrums. The choice of the predefined number is made according to the number of the second spectrums. For example, if there are only two second spectrums, the predefined number is equal to two. In this case, the second processor 6 searches for selected peaks in both of the second spectrums. In another example, if there are seven second spectrums, the predefined number can be between four and seven consecutive spectrums.

The set of second spectrums is then compared to each first spectrum by the second processor 6 in order to calculate the probability that the vibration signal is generated by the defect related to the first spectrum.

By "probability", is meant the classification score quality, ranging from 0, for a totally wrong classification, to 1 for a perfect classification of the defect to detect among the group of predefined defects. This may also be described as a correlation between the first spectrum signature and each of the second spectrums. In particular, the second processor 6 identify harmonics and frequency bands of the first spectrum and the second spectrums to check if they overlap. Thus, the more the frequency data overlap, the greater the probability that the detected defect the same as the defect identified by the first spectrum. The probabilities can then be sent as data to a computer via a wired or a remote cable.

The disclosure is not limited to these embodiments but comprises all the variants. For example, the device 1 can be implemented inside the component and wirelessly transfer the probabilities to a computer.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved devices for identifying defects in a rotating component.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A method of identifying at least one defect of a rotating component bearing, the at least one defect being selected from a group of predefined defects, comprising:
   extracting frequency data related to each of the predefined defects;
   forming a first spectrum signature for each of the predefined defects;
   measuring vibrations produced by the rotating bearing to obtain at least two second spectrums;
   filtering each second spectrum based on an exponential smoothing algorithm,
   selecting peaks in each second spectrum according to a prominence of each of the peaks;
   setting the selected peaks to zero if the selected peaks are not present in a predefined number of consecutive second spectrums, and
   calculating a probability that at least one of the second spectrums indicates a presence of one of the predefined defects of the rotating bearing.

2. The method according to claim 1, wherein the frequency data includes harmonics and sidebands of each predefined defect.

3. The method according to claim 1, wherein selecting peaks includes applying an integrative leaky average algorithm to the second spectrums.

4. The method according to claim 1,
   further including selecting the unknown peaks in each second spectrum based on the most probable first spectrum signature.

5. A device for identifying at least one defect selected from a group of predefined defects of a rotating bearing, comprising:
   acquisition means configured to extract frequency data related to each of the predefined defects;
   computing means configured to form a first spectrum signature from the frequency data related to each of the predefined defects;
   a vibration sensor configured to measure vibrations produced by a rotation of the rotating bearing to obtain at least two second spectrums;
   a filter configured to filter each of the at least two second spectrums based on an exponential smoothing algorithm, and
   processing means configured to select peaks in each second spectrum according to their prominence, to set selected peaks to zero if they are not present in a predefined number of consecutive second spectrums and to compare the at least two second spectrums to each of the first spectrum signatures and to calculate a probability that each second spectrum signature corresponds to one of the predefined defects.

6. The device according to claim 5, wherein the frequency data includes harmonics and sidebands of each predefined defect.

7. The device according to claim 6, wherein the processing means are configured to select the peaks by using an integrative leaky average algorithm.

8. The device according to claim 5, wherein the processing means are configured to select the unknown peaks in each second spectrum based on the most probable first spectrum signature.

9. An integrated circuit comprising a device according to claim 5.

10. A bearing comprising an integrated circuit according to claim 9.

11. A method of identifying at least one defect of a rotating bearing, the at least one defect being selected from a group of predefined defects, comprising:
    providing a first spectrum signature for each of the predefined defects;
    measuring vibrations produced by the rotating bearing to produce at least two second spectrums from the measured vibrations;
    filtering each second spectrum based on an exponential smoothing algorithm,
    selecting peaks in each second spectrum according to a prominence of each of the peaks;
    setting the selected peaks to zero if the selected peaks are not present in a predefined number of consecutive second spectrums,
    calculating a correlation between each first spectrum signature and each of the second spectrums, and
    identifying a probability that each of the second spectrums indicates a presence of one of the predefined defects of the rotating bearing.

* * * * *